Patented Oct. 22, 1946

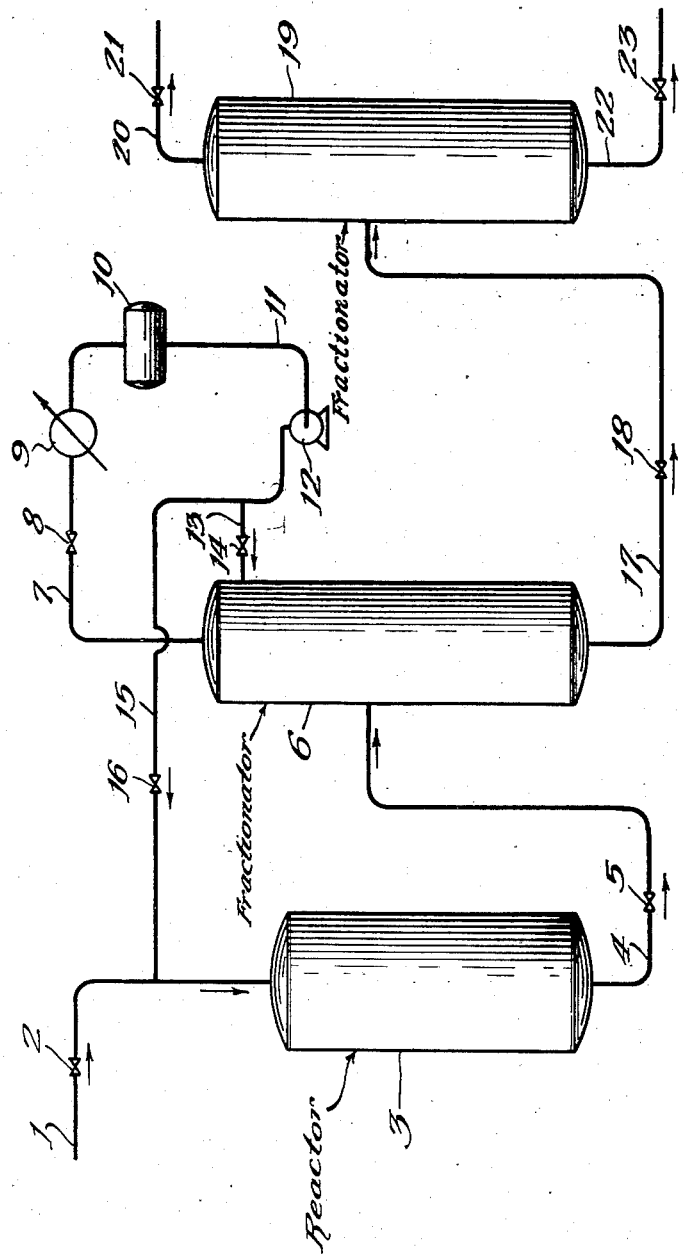

2,409,802

UNITED STATES PATENT OFFICE 2,409,802

PRODUCTION OF ETHYLBENZENE

Louis Schmerling, Chicago, Ill., assignor to Universal Oil Products Company, Chicago, Ill., a corporation of Delaware Application July 24, 1942, Serial No. 452,250

2 Claims. (Cl. 260—671)

This is a continuation-in-part of my co-pending application Serial No. 386,110, filed March 31, 1941.

This invention relates particularly to the production of monoethylbenzene by the interaction of specific reactants in the presence of specific catalysts and under specific operating conditions.

The invention is characterized by the use of benzene as one reactant, ethyl alcohol as the other reactant, phosphoric acid as the catalyst, and specific temperature and pressure conditions of operation. In addition, the present invention discloses a number of other features which will hereinafter be set forth in detail.

It has heretofore been suggested that aromatic hydrocarbons may be reacted with alcohols in the presence of acid type catalysts to produce alkylated aromatics. British Patent No. 464,752 teaches that aromatic compounds may be reacted with compounds yielding olefinic hydrocarbons on dehydration, such as ethers or alcohols, in the presence of phosphoric acid catalysts, but this patent, as well as the other prior art, does not definitely teach the reaction of ethyl alcohol with benzene in the presence of phosphoric acid catalysts.

Since prevision in chemical reactions cannot in all cases be made with accuracy, it cannot be definitely stated in advance that the reaction of ethyl alcohol and benzene will occur under the conditions specified in the reference heretofore mentioned. For example, when using sulfuric acid as the catalyst, aromatic hydrocarbons may be readily alkylated with propyl and butyl alcohols but, to the best of my knowledge, aromatic hydrocarbons cannot satisfactorily be reacted with ethyl alcohol in the presence of sulfuric acid catalyst under any conditions of operation so far determined.

In addition, the present invention discloses the feature of utilizing an excess of benzene in the reaction zone. This operation has a number of advantages, the primary ones being (1) conducting the reactions under substantially adiabatic conditions and (2) dissolving the unconverted ethylene in the benzene for recycling. These and other advantages of this particular method of operation will hereinafter be described in detail.

It is believed that, in the reaction of ethyl alcohol with benzene to produce ethylbenzene, the ethyl alcohol is first dehydrated under the conditions of operation to yield water and ethylene, and that the benzene is then alkylated by the ethylene to produce ethylbenzene. A particular advantage in the use of ethyl alcohol as one of the reactants is that the dehydration reaction is endothermic and absorbs heat, while the alkylation reaction is exothermic and liberates heat. Thus, the heat liberated by the exothermic alkylation reaction is utilized in the endothermic dehydration reaction, and this effects an efficient thermal system and, at the same time, aids in permitting the process of the invention to be effected under substantially adiabatic conditions.

As another particular feature, I have found that, when operating according to the teachings of the present invention, the final products of the process are substantially the desired monoethylbenzene, and that the production of diethylbenzene is substantially avoided. Some undesired higher boiling poly-alkylated aromatics are also produced during the reaction, but these higher boiling products are kept at a minimum, as will be hereinafter shown in the example.

In one specific embodiment the present invention relates to a process for producing monoethylbenzene which comprise contacting benzene with ethyl alcohol in the presence of an acid of phosphorus at a temperature between about 500° F. and about 750° F. under a pressure of between about 200 pounds and about 1200 pounds per square inch.

The ethyl alcohol utilized in the present process may be obtained from any convenient source. It need not be of 100% purity and may contain other compounds in admixture therewith. The ethyl alcohol fraction should not contain propyl alcohol or other higher boiling alcohols or propylene or other higher boiling olefinic hydrocarbons, since these alcohols or olefinic hydrocarbons readily react with benzene and thus will produce higher boiling alkylated products which are not desired in the present operation. It is understood, however, that the results obtained by utilizing different composition ethylene fractions are not necessarily equivalent and that more efficient operation is obtained by utilizing ethyl alcohol fractions of higher purity.

Likewise, the benzene utilized in the present invention may be obtained from any convenient source. The benzene used need not be of 100% purity but may contain other compounds in admixture therewith. The results obtained by different composition benzene-containing fractions are not necessarily equivalent. More efficient operation is obtained by utilizing benzene-containing fractions which are not contaminated with too great quantities of other compounds.

The essential ingredient of the catalyst which is employed in the present invention is phosphoric acid, which may constitute 80% or more of the catalyst mixture and in most cases is over 30% by weight thereof. Of the various acids of phosphorus, ortho- or pyro-phosphoric acids are generally preferred on account of their ethylating abilities, their cheapness, and the readiness with which they may be procured, although the invention is not restricted to their use but may employ any of the other acids of phosphorus insofar as they are adaptable. It is not intended to infer, however, that the different acids of phosphorus which may be employed will produce identical effects upon any given reaction as each acid will exert its own characteristic action. The activity of a given catalyst is also dependent upon the ratio of acid to siliceous adsorbent contained therein.

Solid phosphoric acid catalysts, which are particularly utilizable in the present process, may be made by mixing an acid of phosphorus, such as ortho- or pyrophosphoric acid, with a finely divided, relatively inert and a generally siliceous carrier such as, for example, kieselguhr, to form a rather wet paste (the acid ordinarily being in major proportion by weight); calcining at temperatures in the order of 750° to 950° F. to produce a solid cake; grinding and sizing to produce particles of usable mesh; and rehydrating the catalyst granules at temperatures of the order of 500° F. to produce an acid composition corresponding to the optimum ethylating activity which usually corresponds approximately to the pyro-acid in composition.

This catalyst preparation procedure may be varied by forming particles from the original paste by extrusion or pelleting methods and following with the calcining and rehydrating steps. In the reactions taking place during calcination it is evident that some acid is "fixed" on the carrier and that some metaphosphoric acid, which is substantially without ethylating activity, is formed. The rehydrating step evidently produces an acid composition corresponding closely to the pyro-acid having a formula $H_4P_2O_7$. Unless rehydration is practiced the temperature of approximately 575° F. should not be exceeded in the calcination step. And if higher temperatures produce catalyst particles of greater structural strength, depending upon the character of the carrier and the composition of acid fixed therewith, the composition of the acid may be brought to the desired point by contact with superheated steam at approximately 500° F. at atmospheric pressure. This brief description of a solid phosphoric acid catalyst and of its preparation is not exhaustive, as both have been generally described already in United States Patents Nos. 1,993,512 and 1,993,513 and others.

Solid phosphoric acid catalyst are hygroscopic to a variable extent and are best ground, sized, and preserved for use out of contact with moist air.

As to the conditions of operation which should be employed in the present invention, the temperature should not be below about 500° F. and should not be above about 750° F. and preferably should be within the range of from about 525° to about 675° F. When utilizing temperatures below 500° F. the reaction proceeds very slowly and requires the use of exceptionally long times of contact, which are impractical from a commercial viewpoint. At temperatures above 750° F., difficulty is encountered due to the formation of carbon and the production of considerable amounts of undesired higher and lower boiling products.

The pressure employed should be within the range of about 200 to about 1200 pounds per square inch, and preferably within the range of about 250 to 900 pounds per square inch. The use of the pressures specified herein serves several definite purposes, including dissolving the unreacted ethylene in the benzene, which operation greatly facilitates the recycling of the benzene and ethylene to the reaction zone for further conversion therein. In addition higher yields of the desired mono-ethylbenzene are obtained by the use of the pressures specified than by the use of either higher or lower pressures.

As heretofore mentioned, the ethyl alcohol probably undergoes dehydration to water and ethylene. I have found that substantially complete dehydration of the ethyl alcohol is effected under the conditions of operation and that the products from the reaction zone do not contain ethyl alcohol. However, the products may contain some ethylene which has not reacted with the benzene and, as a particular feature of the present invention, the unreacted ethylene is dissolved in the benzene and recycled to the reaction zone for further conversion therein. The molal ratio of benzene, including both the benzene introduced from an outside source and the recycled benzene, to the alcohol introduced from an outside source and the recycled ethylene should be within the range of about 2:1 to about 20:1, and preferably within the range of about 4:1 to about 16:1. The molal ratio of the benzene to ethyl alcohol and recycled ethylene should not be less than about 2:1, since the benefits of the present invention are not obtained with such low proportions of benzene to ethylene. On the other hand, the use of molal ratios of benzene to ethyl alcohol and recycled ethylene in excess of 20:1 are unnecessary since they produce no further beneficial effects and instead only increase the size and cost of plant equipment beyond practical proportions.

The time of contact to be employed will be correlated with the particular temperature and pressure utilized in any given operation to produce the desired results.

In effecting the reaction between the benzene and ethyl alcohol, according to the present invention, the exact method of procedure varies with the composition and activity of the catalyst employed. A simple procedure consists in contacting a mixture of benzene and ethyl alcohol with the catalyst at the desired temperature and pressure. In case the catalyst is employed in either liquid or finely divided condition, batch or continuous operations may be effected by utilizing an efficient stirring mechanism to insure intimate contact of the reactant and catalyst. In other types of operation the reactants may be mixed with finely divided or powdered catalysts and reacted in a substantially fluid type of operation.

A particularly preferred method of operation is to dispose the catalyst in solid condition in a reaction zone and pass the proper proportions of benzene, ethyl alcohol and recycled ethylene over the catalyst under the desired temperature and pressure conditions. If desired, the ethyl alcohol and/or recycled ethylene-benezene fractions may be introduced at intermediate points in the reaction zone.

The products from the reaction zone will comprise essentially mono-ethylbenzene, higher boiling alkylated aromatics, excess benzene, and unreacted ethylene. These products may be introduced to one or more fractionating or separating zones whereby the desired mono-ethylbenzene is separated and recovered. Likewise, the higher boiling aromatics may be separated and recovered. The excess benzene and unreacted ethylene are usually withdrawn as an overhead product of the fractionating zone and are condensed under conditions to dissolve substantially all of the unreacted ethylene in the benzene. The exact temperature of cooling to be employed will depend upon the excess of benzene, amount of ethylene and the pressure utilized. In general, cooling of these products to substantially atmospheric temperature or slightly lower will be sufficient to dissolve the ethylene in the benzene under the high pressure and with the excess of benzene heretofore specified. This fraction may then be readily pumped back to the reaction zone for further conversion therein. In this method of operation the use of compressors or other expensive equipment to recycle the ethylene is eliminated. This method of operation is particularly important from a commercial viewpoint.

The commercially important operation above referred to will now be described in connection with the accompanying drawing which is a diagrammatic illustration of the process and apparatus elements employed therein.

Referring more particularly to the drawing, benzene and ethyl alcohol are charged through line 1, containing valve 2, and commingled with a recycle stream of benzene containing dissolved ethylene, produced as hereinafter described, and the mixture charged to reactor 3 containing solid phosphoric acid catalyst. In the reactor, the ethyl alcohol is converted to ethylene and water and the benzene is alkylated with the ethylene. The reaction products, which comprise essentially monoethylbenzene, polyethylbenzenes, excess benzene and unreacted ethylene, are removed from the reactor through line 4, containing valve 5, and are passed into fractional distillation means 6. The unreacted benzene and ethylene are withdrawn as an overhead vapor from fractionating means 6 through line 7, containing valve 8, and are passed into condenser 9 where they are condensed under conditions such that substantially all of the ethylene is dissolved in the benzene. The effluent from condenser 9 is passed into receiver 10 from which it is withdrawn through line 11, containing pump 12. Part of the discharge of the pump is directed through line 13, containing valve 14, and enters near the top of fractionator 6 where it serves as reflux. Another portion is recycled through line 15, containing valve 16, to reactor 3. The bottoms product from fractionator 6, which comprises mono and polyethylbenzenes, is withdrawn through line 17, containing valve 18, and is charged to fractionator 19. An overhead product, consisting of monoethylbenzene, is withdrawn from fractionator 19 through line 20, containing valve 21. A bottoms product, comprising polyethylbenzenes, is withdrawn through line 22, containing valve 23.

The following example of one operation is given for the purpose of further illustrating the invention, but not with the intention of unduly limiting the same.

75 cc. of benzene and 4 cc. of ethyl alcohol per hour were passed through 40 cc. of 10-12 mesh solid phosphoric acid catalyst maintained at 662° F. under a pressure of 600 pounds per square inch. 4.8 grams per hour of monoethylbenzene and 0.3 gram of more highly alkylated benzenes were produced. After four hours of operation, the carbon on the catalyst amounted to 0.38% by weight of the catalyst. The exit gas amounted to an average of 0.02 cubic feet per hour. The exit gas at the beginning of the experiment consisted chiefly of nitrogen, which nitrogen was originally introduced to pressure the unit, and later presumably consisted mostly of ethylene, although in this particular experiment the quantity of liberated ethylene was not measured. Water was recovered in admixture with the alkylated products but, in this particular experiment, the amount of water was not measured.

I claim as my invention:

1. A process for the production of monoethylbenzene which comprises reacting benzene, ethyl alcohol and ethylene at a temperature of from about 500° F. to about 750° F. under a pressure of from about 200 pounds to about 1200 pounds per square inch in the presence of a solid prosphoric acid catlayst in a reaction zone, said reaction comprising dehydration of the ethyl alcohol to water and ethylene and alkylation of the benzene by ethylene, separating the reaction products into alkylated benzene and unreacted ethylene and benzene, recovering said alkylated benzene, cooling said unreacted ethylene and benzene under a pressure of from about 200 pounds to about 1200 pounds per square inch in order to dissolve said unreacted ethylene in said benzene, recycling said benzene and dissolved ethylene to the reaction zone for further conversion therein, and maintaining in said reaction zone from 2 to 20 molecular proportions of benzene to one molecular proportion of ethyl alcohol and ethylene.

2. A process for the production of monoethylbenzene which comprises reacting benzene, ethyl alcohol and ethylene at a temperature of about 525° F. to about 675° F. under a pressure of from about 250 pounds to about 900 pounds per square inch in the presence of a solid phosphoric acid catalyst in a reaction zone, said reaction comprising dehydration of the ethyl alcohol to water and ethylene and alkylation of the benzene by ethylene, separating the reaction products into alkylated benzene and unreacted ethylene and benzene, recovering said alkylated benzene, cooling said unreacted ethylene and benzene under a pressure of from about 250 pounds to about 900 pounds per square inch in order to dissolve said unreacted ethylene in said benzene, recycling said benzene and dissolved ethylene to the reaction zone for further conversion therein, and maintaining in said reaction zone from 4 to 16 molecular proportions of benzene to one molecular proportion of ethyl alcohol and ethylene.

LOUIS SCHMERLING.